(12) United States Patent
Devernay et al.

(10) Patent No.: US 11,367,263 B1
(45) Date of Patent: Jun. 21, 2022

(54) IMAGE-GUIDED THREE DIMENSIONAL MODELING

(71) Applicant: Amazon Technologies, Inc., Seattle, WA (US)

(72) Inventors: Frederic Laurent Pascal Devernay, Bellevue, WA (US); Thomas Lund Dideriksen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/910,811

(22) Filed: Jun. 24, 2020

(51) Int. Cl.
*G06T 19/20* (2011.01)
*G06T 7/80* (2017.01)

(52) U.S. Cl.
CPC ............. *G06T 19/20* (2013.01); *G06T 7/80* (2017.01); *G06T 2200/24* (2013.01); *G06T 2219/2021* (2013.01)

(58) Field of Classification Search
CPC ....... G06T 19/20; G06T 7/80; G06T 2200/24; G06T 2219/2021
See application file for complete search history.

(56) References Cited

U.S. PATENT DOCUMENTS

| 6,281,904 B1 | 8/2001 | Reinhardt et al. |
| 6,333,749 B1 | 12/2001 | Reinhardt et al. |
| 7,193,633 B1 | 3/2007 | Reinhardt et al. |
| 7,602,404 B1 | 10/2009 | Reinhardt et al. |
| 2006/0056698 A1* | 3/2006 | Jolly .................. G06V 10/7553 382/190 |
| 2013/0124148 A1* | 5/2013 | Jin ............................ G06T 7/55 703/1 |
| 2020/0210768 A1* | 7/2020 | Turkelson ............ G06K 9/6218 |
| 2020/0388071 A1* | 12/2020 | Grabner ................. G06V 20/64 |
| 2021/0390776 A1* | 12/2021 | Wang ........................ G06T 7/50 |

OTHER PUBLICATIONS

Kraevoy, Vladislav, Alla Sheffer, and Michiel van de Panne. "Modeling from contour drawings." Proceedings of the 6th Eurographics Symposium on Sketch-Based interfaces and Modeling. 2009.*
Mu, Pan-pan, et al. "Image-based 3D model retrieval using manifold learning." Frontiers of Information Technology & Electronic Engineering 19.11 (2018): 1397-1408.*

(Continued)

*Primary Examiner* — Maurice L. McDowell, Jr.
(74) *Attorney, Agent, or Firm* — K&L Gates LLP

(57) ABSTRACT

Devices and techniques are generally described for image-guided three dimensional (3D) modeling. In various examples, a first two-dimensional (2D) image representing an object may be received. A first three-dimensional (3D) model corresponding to the first 2D image may be determined from among a plurality of 3D models. A first selection of a first portion of the first 2D image may be received. A second selection of a second portion of the first 3D model corresponding to the portion of the first 2D image may be received. At least one transformation of the first 3D model may be determined based at least in part on differences between a geometric feature of the first portion of the first 2D image and a geometric feature of the second portion of the first 3D model. A modified 3D model may be generated by applying the at least one transformation to the first 3D model.

20 Claims, 6 Drawing Sheets

(56) References Cited

OTHER PUBLICATIONS

Grabner, Alexander, Peter M. Roth, and Vincent Lepetit. "3d pose estimation and 3d model retrieval for objects in the wild." Proceedings of the IEEE Conference on Computer Vision and Pattern Recognition. 2018.*
Han, Xian-Feng, Hamid Laga, and Mohammed Bennamoun. "Image-based 3D object reconstruction: State-of-the-art and trends in the deep learning era." IEEE transactions on pattern analysis and machine intelligence 43.5 (2019): 1578-1604.*
Su, Hao, et al. "Render for cnn: Viewpoint estimation in images using cnns trained with rendered 3d model views." Proceedings of the IEEE International Conference on Computer Vision. 2015.*
Debevec et al.; Modeling and Rendering Architecture from Photographs; SIGGRAPH '96: Proceedings of the 23rd annual conference on Computer graphics and interactive techniques; Aug. 1996; 10 pgs.
Kholgade et al.; 3D Object Manipulation in a Single Photograph using Stock 3D Models; 2014; 13 pgs.
Huang et al.; Appearance Modeling via Proxy-to-Image Alignment; ACM Transactions on Graphics 2018; 2018; 5 pgs.
Chen et al.; 3-Sweep: Extracting Editable Objects from a Single Photo; 2013; 10 pgs.

* cited by examiner

IMAGE-GUIDED THREE DIMENSIONAL MODELING

BACKGROUND

Images, such as photographs, are often projections from a three-dimensional scene to a two-dimensional plane, during which the depth data of the three-dimensional scene is lost. Various techniques are used to generate three-dimensional images or "models" from two-dimensional images. For example, triangulation techniques may be used to determine the relationships between multiple two-dimensional views of an object. The multiple views convey information regarding the structure of the object related to the poses and calibrations of the cameras capturing the different views. Typically, the quality of the output three-dimensional model is related to the number of different vantages of the object, which is, in turn, dependent on the number of two-dimensional images of the object available. The number of images used to generate a high-quality three-dimensional model is often a function of the complexity of the object and/or of the lighting conditions.

BRIEF DESCRIPTION OF DRAWINGS

FIGS. 2A-2E depict example Hessian and Jacobian matrices for various bundle adjustment problems that may be solved using non-linear least squares in order to provide image-guided three-dimensional modeling, according to various embodiments of the present disclosure.

DETAILED DESCRIPTION

Figure 1:
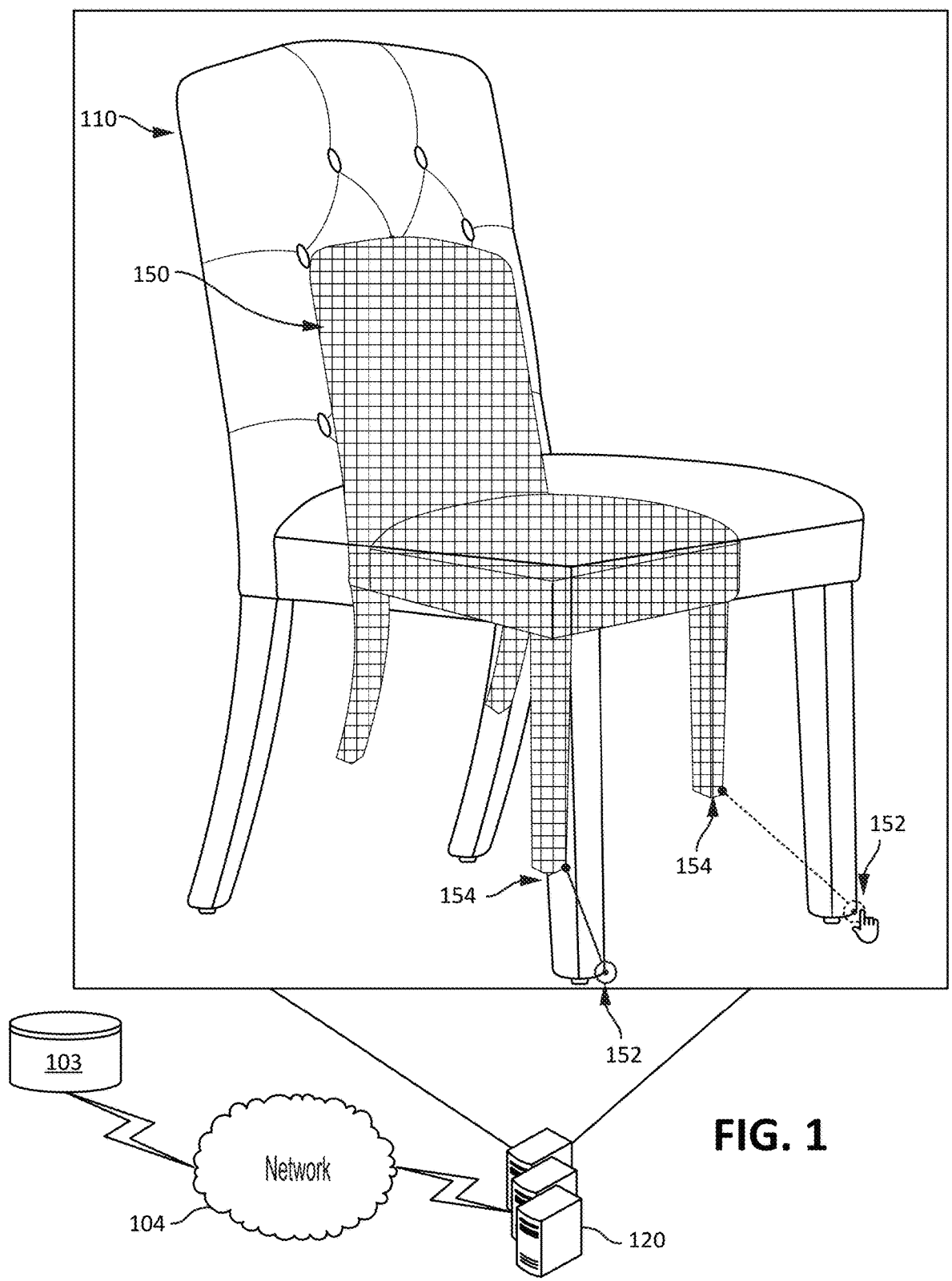
FIG. 1 depicts an example of image-guided three-dimensional modeling, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Three-dimensional (3D) models may be generated as a 3D representation of an object for various different applications. For example, a 3D model may be used to see an object from multiple different perspective views. In another example, a 3D model of an object may be used to understand how the object appears under different lighting conditions. 3D models are often used in augmented reality and/or virtual reality so that representations of the object may be perceived within the augmented and/or virtual environment.

Generating 3D models of objects represented in two-dimensional (2D) image data is a classical problem in computer vision. Often, artists use various software tools (e.g., Zbrush, Maya, etc.) in order to generate realistic looking 3D models from objects depicted in a 2D image. While this approach generates realistic looking 3D models, it is very time consuming with a typical 3D model often taking several hours to generate. Additionally, the artist-based approach requires significant expertise in order to generate a 3D model for a reasonably complex object. Accordingly, partial or full automation of the 3D modeling process may result in large cost savings and decreased modeling time.

Various techniques have previously been used to generate 3D models from 2D images. However, in order to generate realistic-looking 3D models, such techniques typically require a large number of 2D images, with the number of 2D images required typically being proportional to the complexity of the object. For example, various photogrammetric techniques require hundreds of 2D images to construct a realistic 3D model of a reasonably complex object. Generally, photogrammetric techniques for constructing 3D models from 2D images uses the position of the camera used to capture the overlapping 2D images of the object to estimate X, Y, and Z (depth) coordinates for each pixel of the object in the 2D images.

In some other examples, artists may create 3D models of objects using specialized software. The 3D modeling process can be broadly divided into two parts: (1) creating the 3D model representing the shape of the product, and (2) creating physically-based rendering (PBR) materials that significantly contribute to the photorealism of the result. In contrast to the automated photogrammetric techniques described above whereby realistic 3D models can be generated from a large number of 2D images, an artist can generate a realistic 3D model from either looking at the object itself or from a single image.

However, both of these approaches have limitations. In the automated photogrammetric techniques described above, a large number of 2D images are needed to generate 3D models of reasonably complex objects. In some contexts, the object to be modeled may not be physically present and/or only a limited number of photographs of the object may be available. In such examples, it may not be possible to obtain the necessary amount of 2D images of the object needed to generate a realistic 3D model of the object. The artist-based approach described above is typically very time consuming, with a single 3D model often taking several hours to generate.

In various example embodiments described herein, techniques are described that can generate realistic 3D models of an object from either a single 2D image of the object or a small number of 2D images of the object (e.g., 1-5 images). In an example embodiment, one or more 2D images of the object are used to retrieve a 3D model from a data store that most closely resembles the object depicted in the one or more 2D images from among the 3D models stored in the data store. In further example embodiments, various transformations are applied to the retrieved 3D model based on differences between the object as represented in the 2D image and the 3D model. In various examples, an optimization problem is solved to determine the appropriate transformations of the 3D model. Geometric features that are optimized may include intrinsic and/or extrinsic camera parameters, and/or deformation of the 3D model in order to match the one or more input 2D images.

In various embodiments described herein, machine learning approaches are used to generate embeddings representing the 3D models stored in a data store. Additionally, a model is trained to map different projected views of the various 3D models with random lighting and background conditions to the embedding vector of the corresponding 3D shape. Thereafter, 3D models (e.g., shapes) may be retrieved using one or more 2D images to query the data store. An embedding vector representing the 2D image is used to search the data store for the 3D model having the closest embedding (in the shared embedding space) to the input embedding vector representing the 2D image. Generally, in machine learning, an embedding is a mapping of a discrete, categorical variable to a vector of continuous numbers. In neural networks, embeddings are typically of lower dimensions relative to the data that the embeddings represent.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 depicts an example of image-guided three-dimensional modeling, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet.

Input 2D image data 110 may be one or more frames of image data representing an object. For example, the input 2D image data 110 may be a photograph of a chair sitting in a living room. In the example shown in FIG. 1, input 2D image data 110 is depicted as part of a user interface that may be displayed on a display of a computing device (e.g., on a display associated with computing device(s) 120). In various examples, a 3D model that is closest to the object depicted in the 2D image data 110 (from among a plurality of 3D models stored in memory) may be determined. Various techniques for determining the most similar 3D model to the object depicted in the 2D image data 110 are described in further detail below.

In various examples, after retrieving the similar 3D model (e.g., 3D model 150 retrieved from a memory based on the input 2D image data 110), the 3D model may be aligned to the 2D image data 110. For example, a user may use user controls on the graphical user interface to position the 3D model 150 so that it is in the same pose as the object depicted in the 2D image data 110. Positioning the 3D model 150 may include translating the 3D model to the corresponding portion of the 2D image data 110 so that the 3D model 150 is superimposed on the object's representation in the 2D image data 110. Additionally, the 3D model 150 may be rotated so that the perspective view of the 3D model 150 approximately matches the perspective view of the object represented in the 2D image data 110. In some further example, the size of the 3D model 150 may be adjusted so that the size of the 3D model 150 approximately matches the size of the object represented in the 2D image data 110.

Once the 3D model 150 is approximately aligned with the object represented in the 2D image data 110, the user may select pairs of corresponding tie points on the 2D image data 110 and the 3D model 150. For example, tie point 152 of the 2D image data 110 may correspond to one or more pixels representing a tip of the chair leg of the chair depicted in 2D image data 110. Tie point 152 may correspond with tie point 154 of the 3D model 150, as tie point 154 likewise is associated with the tip of the leg of the chair represented by 3D model 150. Similarly, both tie points 152, 154 may be associated with the same chair leg (e.g., the back left leg of the chair). In some examples, tie points may be selected by clicking on a point in either the 2D image data or the 3D model and dragging the mouse to the corresponding point on the other representation of the object. For example, if a pixel of the 2D image data 110 is selected as the first tie point 152, the user may drag a pointer to the corresponding point on the 3D model to generate the pair of tie points 152, 154. In various examples, the various deformation and/or other transformation operations described herein may occur as each pair of corresponding tie points between the 2D image data 110 and the 3D model 150 are selected. Accordingly, a user may select as many pairs of tie points as desired to transform the 3D model 150 to closely resemble the 2D image data 110.

In addition, in some examples, instead of selecting tie points (e.g., individual pixels of the 2D image data and/or of the 2D projection of the 3D model), contours of the object and/or the model may be selected and/or automatically determined. Selection of a contour may use edge detection techniques to determine the outline (e.g., silhouette) of a portion of the object depicted in the 2D image data 110. Accordingly, a user may select a portion of the chair back of the 2D image data 110. Upon selection of the portion of the chair back, edge detection may be used to determine the outline of that portion of the chair. Accordingly, in some embodiments, the various transformation operations described herein may be applied on the basis of contours and/or based on some combination of individual tie points and contours instead of on individual tie points alone.

In various examples, parameters may be determined for the tie points 152, 154 and an optimization problem may be solved to determine the transformations that should be applied to the 3D model 150 to conform the 3D model 150 to the 2D image data 110. Accordingly, corresponding geometric representations of the tie points 152, 154 may be determined representing various geometric features such as camera parameters, spatial parameters, 2D points, 2D curves, 3D points, and/or 3D curves. 2D points may comprise a point identified in a 2D image by 2D pixel coordinates. 2D curves may comprise and/or be described as a polyline, a parametric curve such as a Bezier and/or a 2D Spline (usually corresponding to an edge in a 2D image), etc. 3D points may be 3D pixel coordinates identified on the surface of the 3D model (e.g., a 3D corner of the model). 3D curves may be a curve on the surface of the 3D model. The 3D curve may be manually drawn on the surface of the 3D model (e.g., during selection of the tie points/contour), may be computed from the surface of the model (e.g., computation of example creases), computed from both the surface and the camera viewpoint (e.g., silhouette rim and/or suggestive contours), etc. In various examples described below, although "parameters" may be referred to, it may be generally understood that geometric features (e.g., whether or not parameterized) may instead be used.

In various examples, the objective function to be optimized may be $$\Sigma((x_i - P(X_i))^2 / \sigma_i^2)$$

where $X_i$ are vectors representing geometric features of points of the 3D model 150 (e.g., tie points 154), $x_i$ are the vectors representing the corresponding 2D image data 110 tie points (e.g., tie points 152), P is the camera projection function used to project the 3D model 150 to a 2D projection of that model from a particular camera viewpoint, and $\sigma_i$ is an error term representing the expected error on $x_i$. In other words, $\sigma_i$ represents user error when selecting the pixel(s) of the 2D image data 110. Accordingly, the objective function output may be a sum of the squared differences (e.g., $x_i - P(X_i)$—the residual) divided by $\sigma_i^2$.

The vectors $X_i$ and $x_i$ may be multi-dimensional and may represent a plurality of different geometric features associated with the selected portions of the 3D model 150 and the 2D image data 110, respectively. In various examples, the geometric features may include intrinsic camera parameters such as focal length and/or the principal point of the camera capturing the image (and/or the virtual camera generating the 2D projection of the 3D model). In some examples, the geometric features may include extrinsic geometric features such as the positioning of the camera in 3D space, the pose of the camera, etc. Additionally, there may be spatial data geometric features. For example there may be geometric features describing an x axis, y axis, and z axis position of the tie points (and/or contours) in 3D space. In various examples, described further in the mathematical explanations below, deformation of the 3D model 150 to conform to the 2D image data 110 may be modulated by local and/or global symmetries of the 3D model. Accordingly, a symmetric warping operation may be used to deform the 3D model to conform to the 2D image data 110 based on symmetry of the 3D model.

Various example techniques that may be used to implement image-guided 3D modeling are described in further detail below.

Non-Linear Least Squares

General Form. A non-linear least-squares (NLS) problem is an optimization problem of the form:

$$\min_x \frac{1}{2} \|f(x_1, \ldots, x_n)\|^2, \quad (1)$$

where $x = (x_1, \ldots, x_n)$ is the vector of variables, and $f(x_1, \ldots, x_n)$ is the m-dimensional vector of residuals. The solution of the NLS problem is the vector x that minimizes eq. (1). A simple yet efficient method to solve this kind of problem is the Gauss-Newton algorithm (GN), which requires only knowing the function and its first derivatives. The main issue with GN is that it may easily not converge when solving difficult NLS problems, especially those with lots of nonlinearities. An extension of GN is the Levenberg-Marquardt algorithm (LM), which interpolates between GN and gradient descent, and belongs to the family of trust-region methods. LM is used to solve many computer vision problems, including the bundle adjustment problem described below.

Line-search methods can also be used to solve NLS problems, including BFGS and L-BFGS, and they also use the first derivatives of the function $f$, which can be expressed as its Jacobian matrix.

The Jacobian matrix of f is defined as a m×n matrix, denoted by J, whose (i, j) entry is $$J_{ij} = \frac{\partial f_i}{\partial x_j},$$

or explicitly:

$$J = \begin{bmatrix} \frac{\partial f}{\partial x_1} & \cdots & \frac{\partial f}{\partial x_n} \end{bmatrix} = \begin{bmatrix} \frac{\partial f_1}{\partial x_1} & \cdots & \frac{\partial f_1}{\partial x_n} \\ \vdots & \ddots & \vdots \\ \frac{\partial f_m}{\partial x_1} & \cdots & \frac{\partial f_m}{\partial x_n} \end{bmatrix} \quad (2)$$

In large NLS problems (i.e., with both many variables and many residuals), the Jacobian matrix is usually sparse, and the non-zero blocks of the Jacobian can be referred to as residual blocks. The LM or BFGS algorithms can be optimized to solve very large problems with a sparse Jacobian, using sparse matrix decomposition methods that are based on the block structure of the Jacobian matrix. Specifically, geometric features and residuals can be divided into groups, so that only the non-zero blocks of the Jacobian have to be evaluated and factored.

Each residual block groups together residuals that depend on a subset of geometric features, and the full residuals vector $f(x_1, \ldots, x_n)$ is the concatenation of the residual blocks $f_i(x_{i_1}, \ldots, x_{i_k})$, where $i_j \in [1, n]$ is the subset of geometric features that this residual depends on.

In some examples, the residual blocks may be set by having a separate block for each physical measurement. For example, if the measurement is a 2-D point $(\underline{u}_i, \underline{v}_i)$, the corresponding residual block would be $$f_i(x_{i_1}, \ldots, x_{i_k}) = \left(\frac{1}{\sigma}(u_i - \underline{u}_i), \frac{1}{\sigma}(v_i - \underline{v}_i)\right),$$

where $(u_i, v_i)$ is the predicted point position by the model being optimized, and $\sigma_i$ is the expected variance of the measurement error (e.g., the spatial error that is typically 1 or 2 pixels if the 2-D measurement is the result of a mouse click on an image). The corresponding part of the objective function from eq. (1) is:

$$\frac{1}{2}\|f_i(x_{i_1},\ldots,x_{i_k})\|^2 = \frac{1}{2\sigma_i^2}((u_i - \underline{u}_i)^2 + (v_i - \underline{v}_i)^2) \quad (3)$$

Robust Optimization. The problem with least-squares solutions is that they are very sensitive to erroneous measurement points, also known as outliers, which have a high influence on the solution. One way to mitigate the effect of the outliers is to (1) Separate each physical measurement in a separate residual block i, (2) Normalize each residual by its expected standard deviation, so that each residual is unit-less. As a result, a value below 1 corresponds to an inlier, and a value above 1 corresponds to a potential outlier. Residual normalization is essential to be able to deal with outliers. (3) Use a robust loss function $p_r(s)$ which is applied on the squared residuals for that residual block, and reduces the effect of outliers.

The objective function for the problem effectively becomes:

$$\min_x \frac{1}{2}\sum_i \rho_i(\|f_i(x_{i_1},\ldots x_{i_k})\|^2). \quad (4)$$

Two common loss functions used in NLS problems are the Huber loss and the Cauchy loss. The Huber loss, which resembles the standard loss close to zero (for non-outliers), and an absolute value function (or L1 loss) when the residual is greater than 1 (for outliers). The effect of Huber loss is that, as soon as a point is an outlier (s>1), is has the same influence on the objective function whether it is a small outlier (e.g. s=2) or a very large outlier (e.g. s=200).

In the Cauchy loss, where the influence of each outlier becomes smaller as the residual grows: the slope of $\rho(x^2)$ decreases as x grows. Although it the Cauchy loss may seem preferred to the Huber loss initially (if outliers are detected beforehand, they should even have no influence at all), it does not have the same convergence properties as the Huber loss, and produces more local minima. Accordingly, the Cauchy loss may be used in cases where the initial parameter values are close enough to the solution.

The mathematical expressions for these loss functions are:

(null loss) $\quad \rho(s) = s$ (Huber loss) $\quad \rho(s) = \begin{cases} s & s \leq 1 \\ 2\sqrt{s} - 1 & s > 1 \end{cases}$ (Cauchy loss) $\quad \rho(s) = \log(1 + s)$ Bundle Adjustment In Computer Vision Computer vision solves more generic problems than the problems found in photogrammetry. The most general problem is known as Structure from Motion (SfM). The goal of SfM is, from a collection of images with 2D matches between these images (usually obtained by automatic feature matching), to compute both the camera parameters (extrinsic and intrinsic) and the 3D position of points corresponding to each set of 2D matches. The parameters blocks in this problem are (1) a block for each camera with its intrinsic parameters—usually 3 (focal length and principal point) to 11 (including nonlinear distortions) parameters per camera, (2) a 6-D block for each camera with the 6 pose parameters (rotation and translation), and (3) a 3-D block for each 3-D feature (a virtual 3D point of unknown coordinates), with its three world coordinates. The residuals blocks are (1) a 2-D residual block for each fiducial point (projection in a given camera of a 3D point with known coordinates), and (2) a 2-D residual block for each homologous point (projection in a given camera of a 3D feature).

Bundle Adjustment for Model-to-Image Alignment

The model-to-image alignment problem is the following: 3D vertices are picked from a 3D mesh, and each 3D vertex is assigned to a 2D position in an image (as shown in FIG. 1). In general, the selected 3D vertices are different in each image.

Simple Alignment

In its simplest form, the 3D mesh serves as a calibration object for the camera: the camera pose is estimated from the 3D-to-2D matches in each image. This problem is called the perspective-n-points (PnP) problem, or PnPf if the focal length of the camera should also be estimated. As described herein, the problem can be treated as an NLS problem.

In this problem, the only variables are the camera poses and the camera intrinsic parameters. Each image may be taken with different camera parameters. Accordingly, the focal length and the principal point of each camera are optimized. Since the images are usually cropped, the principal point may be anywhere in the cropped image. There are thus 9 parameters per image: 6 for the pose, and 3 for the intrinsic parameters. The image parameters form a single parameter block.

Two image (parameter blocks 1-2) and six 3D-to-2D matches (parameter blocks a-f) are considered. Points a-c may be set in a first image (e.g., image 1), and points d-f may be set in a second image (e.g., image 2). Let $P_i: X \rightarrow x$ be the projection function associated with camera $i \in \{1,2\}$, which depends on the pose and intrinsics of camera i. A 3D-to-2D match maps a 3D point $X_j$, $j \in \{a, b, c, d, e, f\}$ to its measured 2D position $\underline{x}_j$.

The residual block $j (j \in \{a, b, c, d, e, f\})$ is a 2-D vector of the form $(P_{i(X_j)} - \underline{x}_j)/\sigma_x$, where I is the camera where point j is visible, and $\sigma_x$ is the expected standard deviation of the error variance (typically 1 or 2 pixels if the 2-D points are mouse clicks):

| | |
|---|---|
| $(P_1(X_a) - \underline{x}_a)/\sigma_x$ | a: |
| $(P_1(X_b) - \underline{x}_b)/\sigma_x$ | b: |
| $(P_1(X_c) - \underline{x}_c)/\sigma_x$ | c: |
| $(P_2(X_d) - \underline{x}_d)/\sigma_x$ | d: |
| $(P_2(X_e) - \underline{x}_e)/\sigma_x$ | e: |
| $(P_2(X_f) - \underline{x}_f)/\sigma T_x$ | f: |

All the points visible in an image could be considered as a single residual block, since they are distinct from the points in the other images, but using a separate residual block for each 2D point permits outlier rejection using a robust loss. The Jacobian 202 and the Hessian 204 for this problem have the form depicted in FIG. 2A.

Note that the Hessian 204 is block-diagonal, indicating that the two problems of estimating the geometric features of image 1 and the geometric features of image 2 are decoupled and can be solved separately (as already known from the PnP problem).

Alignment with Deformation. Now, let it be supposed that a parametric 3D deformation α: X→X' is applied to the 3D mesh before it is projected onto the images.

This deformation could have any number of geometric features. For example, a scaling along each of the x, y, z axes with three different scale factors would have only 3 geometric features, but a deformation, but a 3D free-form deformation (FFD) controlled by 4×4×4 3D control points would have 192 geometric features. The goal is to optimize that deformation, as well as the camera parameters, using the same 3D-to-2D matches.

The residual block j (j 2 fa; b; c; d; e; fg) is a 2-D vector of the form $P_i(\alpha(X_j))-\underline{x}_j$, and it depends both on the geometric features (e.g., parameters) of camera i and on the deformation geometric features of α:

| | |
|---|---|
| $(P_1(X_a)-\underline{x}_a)/\sigma_x$ | a: |
| $(P_1(X_b)-\underline{x}_b)/\sigma_x$ | b: |
| $(P_1(X_c)-\underline{x}_c)/\sigma_x$ | c: |
| $(P_2(X_d)-\underline{x}_d)/\sigma_x$ | d: |
| $(P_2(X_e)-\underline{x}_e)/\sigma_x$ | e: |
| $(P_2(X_f)-\underline{x}_f)/\sigma_x$ | f: |

Figures 2A, 2B, 2C, 2D, 2E:
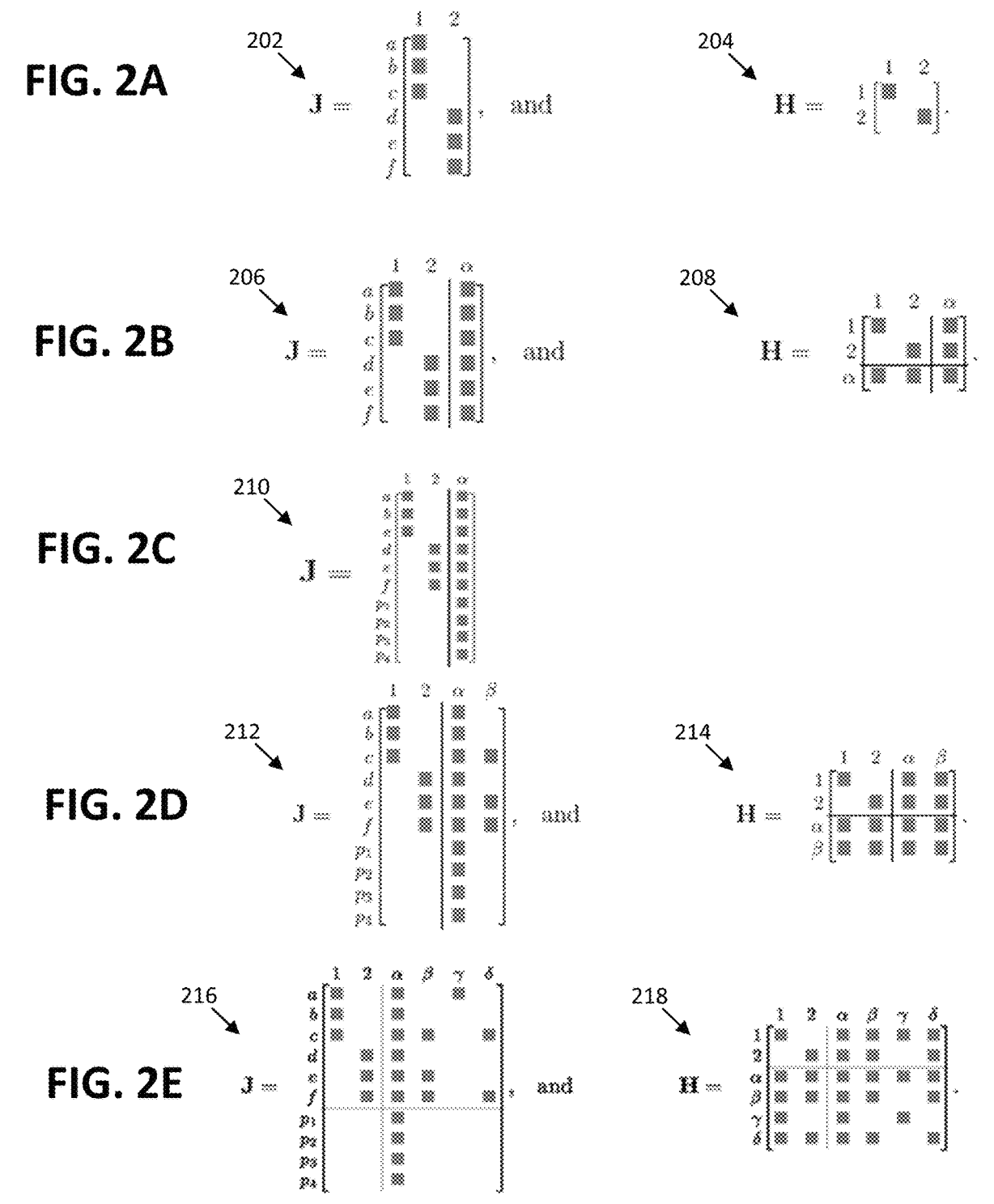

The Jacobian and Hessian for the problem are depicted in FIG. 2B as Jacobian 206 and Hessian 208. The Hessian 208 is not block-diagonal anymore, and the problem becomes coupled between all views. Another detail is that if the deformation allows for similarity transforms (e.g., compositions of rotation, translation and scaling), then the problem has the same gauge freedom as the generic SfM problem. Gauge constraints can thus be added to the problem.

A minimal gauge constraint can be obtained by setting the pose of the first image to the identity transform (this kind of constraint is called parameter freezing), and set a single constraint on the deformation so that its scale is constrained. However, this solution may not be trivial to apply to generic deformations such as FFDs.

Another solution is to add more residuals, even if they have a low influence. The residuals can be used to stabilize the deformation close to the identity transform, thus blocking scale, rotation and translation. For example, if the deformation is obtained by the displacement of four 3D control points $Y_i$ from their rest position $Y_i^0$, we can add one 3D residuals block for each control point, $p_i$.

In this setup, the residual blocks are:

| | |
|---|---|
| $(P_1(\alpha(X_a))-\underline{x}_a)/\sigma_x$ | a: |
| $(P_1(\alpha(X_b))-\underline{x}_b)/\sigma_x$ | b: |
| $(P_1(\alpha(X_c))-\underline{x}_c)/\sigma_x$ | c: |
| $(P_1(\alpha(X_d))-\underline{x}_d)/\sigma_x$ | d: |
| $(P_1(\alpha(X_e))-\underline{x}_e)/\sigma_x$ | e: |
| $(P_1(\alpha(X_f))-\underline{x}_f)/\sigma_x$ | f: |
| $p_1:(Y_1-Y_1^0)/\sigma_P$ | |
| $p_2:(Y_2-Y_2^0)/\sigma_P$ | |
| $p_3:(Y_3-Y_3^0)/\sigma_P$ | |
| $p_4:(Y_4-Y_4^0)/\sigma_P$ | |

The form of the Jacobian is depicted in FIG. 2C as Jacobian 210.

The residuals may be standard squared residuals with a large scale $\sigma_p$ (e.g., the scale could be for example half the spacing between un-deformed control points), or a scaled robust loss may be applied, where the scale for the inner robust loss (e.g., Huber loss) is small, but the resulting loss is down-scaled to reduce its overall effect. For example, if n is the number of control points, the loss for the displacements could be $$\frac{1}{n}\rho(s),$$

so that the residuals for all the control points taken together would not have more influence than a single 2D match.

Alignment with Hierarchical Deformation. It may be supposed that a deformation β is applied to a part of the 3D mesh, and it is further composed with α before projection. In an example, it may be that only points c, e, and f are affected by β. These points will thus be deformed by a $\alpha_\circ\beta$, where $\circ$ is the function composition operator. The gauge constraints described above may also be added, which are set on the control points of the root deformation α, since nested deformation should all depend on the that root deformation.

In such a scenario, the residual blocks are:

| | |
|---|---|
| $(P_1(\alpha(X_a))-\underline{x}_a)/\sigma_x$ | a: |
| $(P_1(\alpha(X_b))-\underline{x}_b)/\sigma_x$ | b: |
| $(P_1(\alpha(X_c))-\underline{x}_c)/\sigma_x$ | c: |
| $(P_1(\alpha(X_d))-\underline{x}_d)/\sigma_x$ | d: |
| $(P_1(\alpha(X_e))-\underline{x}_e)/\sigma_x$ | e: |
| $(P_1(\alpha(X_f))-\underline{x}_f)/\sigma_x$ | f: |
| $p_1:(Y_1-Y_1^0)/\sigma_P$ | |
| $p_2:(Y_2-Y_2^0)/\sigma_P$ | |
| $p_3:(Y_3-Y_3^0)/\sigma_P$ | |
| $p_4:(Y_4-Y_4^0)/\sigma_P$ | |

The Jacobian and Hessian are depicted in FIG. 2D as Jacobian 212 and Hessian 214. The Hessian 214 is very similar to the one with a single deformation, and the number of geometric features remains low, indicating that the problem may not be too difficult to solve. More levels of deformation in the hierarchy can be added in a similar way, as long as all levels are composed with the root deformation. Notably, adding more 2D points does not increase the difficulty of the problem.

In a slightly more complicated example, two additional deformations are added, including a nested deformation where γ affects point a, and δ is a sub-deformation of β which only affects c and f. This indicates that to get the deformed 3-D position of c, one must apply δ, then β, then α to the original position.

In such an example, the residual blocks are:

| | |
|---|---|
| $(P_1(\alpha_\circ\gamma(X_a))-\underline{x}_a)/\sigma_x$ | a: |
| $(P_1(\alpha(X_b))-\underline{x}_b)/\sigma_x$ | b: |

$$c: (P_1(\alpha_o\beta_o\delta(X_c))-\bar{x}_c)/\sigma_x$$

$$d: (P_2(\alpha(X_d))-\underline{x}_d)/\sigma_x$$

$$e: (P_2(\alpha_o\beta(X_e))-\underline{x}_e)/\sigma_x$$

$$f: (P_2(\alpha_o\beta_o\delta(X_f))-\underline{x}_f)/\sigma_x$$

$$p_1: (Y_1-Y_1^0)/\sigma_P$$

$$p_2: (Y_2-Y_2^0)/\sigma_P$$

$$p_3: (Y_3-Y_3^0)/\sigma_P$$

$$p_4: (Y_4-Y_4^0)/\sigma_P$$

The Jacobian and Hessian are depicted in FIG. 2E as Jacobian 216 and Hessian 218.

Solving Bundle Adjustment Problems in Practice

In various examples, Ceres Solver may be a software package used to solve bundle adjustment problems. Ceres Solver is used in many SfM packages (e.g. OpenMVG, TheiaSfM, and others).

Minimal Parameterization

When modeling a new problem, using a minimal parameterization of the problem can be important. In some rare cases, when the over-parameterization happens within a parameter block, Ceres proposes to use a local parameterization. This is especially useful, for example, if rotations are parameterized by quaternions (4 parameters for a 3-degree manifold). When the over-parameterization happens across parameter blocks (e.g., both the scene and the camera can rotate freely), it must be solved either by rewriting the problem, or by adding residuals which decouple the parameters, like the 3D residuals on the control points we propose for handling FFDs in model-to-image alignment. An over-parameterized problem will pose both numerical and performance issues for the optimizers.

Automatic Differentiation

Each residual block in the cost function is written so that it can be auto differentiated.

Residuals Normalization. All residuals are normalized by their expected standard deviation. The main reason is that the robust loss functions are based on a standard deviation of 1 on all residuals, but it also helps having better problem conditioning and avoiding over- and under-flows in numerical computations.

If there is no clear insight on the expected standard deviation, one approach is to compute it from measurements taken on images with known ground truth (for example, the task would be to align a model on a synthetic render of the same model). Since there may be a few outliers in the measurements, a robust estimate of the standard deviation can be obtained using the Median Absolute Deviation: MAD=median ($|X_i-\tilde{X}|$), where $\tilde{X}$=median(X)). Supposing the error follows a Gaussian distribution, its standard deviation is obtained as $\tilde{\sigma}=1.4826 \cdot$MAD.

Variable Scaling

Variables/geometric features are scaled, so that their expected order of magnitude is not too far from 1, for optimization algorithm performance. For example, when modeling a bundle adjustment problem where the 3D model size is a few meters and the camera distance is also a few meters, the 3D coordinate system should be in meters and not millimeters. Scaling and preconditioning affects the performance of first order methods such as the gradient descent used in Levenberg-Marquardt (LM).

Loss Function

As explained above, when there are outliers in the measurements and the initial geometric features are not known to be close to the solution, it may be beneficial to do a first optimization with a null loss, and then to transition to Huber loss before a final optimization with Cauchy loss. If this strategy is unsuccessful, a loss function wrapper can be used to reduce the scale of the Huber loss progressively.

Parameters Freezing

Sometimes, an estimate of parameters value is available. For example, the principal point should normally be at the center of the image, or the focal length of a camera could be obtained from the EXIF data. In such cases, a first optimization can be done by setting these parameters to their estimate and freezing them during the first optimization. Having a model with less parameters is also beneficial in the presence of outliers.

Covariance Estimation

After optimization, it may be important to estimate and inspect the covariance matrix at the optimum (which is the inverse of the Hessian). The covariance is un-scaled if the parameters were scaled: the term (i, j) must be multiplied by the scale of variables i and j. The diagonal (variances) can provide an estimate of the dispersion of parameter values. If the Jacobian is rank deficient, which may occur if there is a gauge freedom in the problem, it is considered as a major issue in the problem formulation, which has to be examined further.

Figure 3:
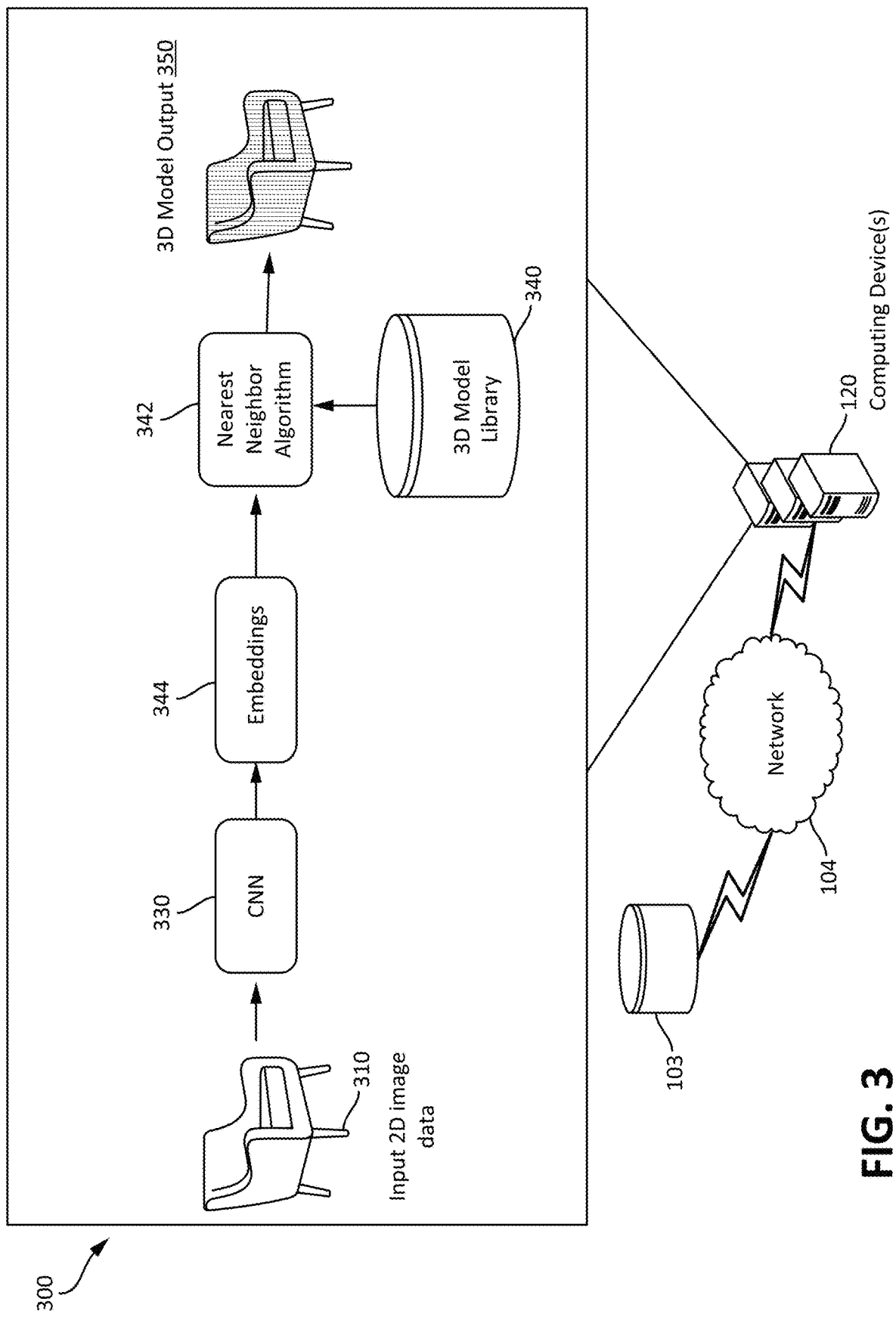
FIG. 3 depicts an example block diagram of a system effective to retrieve a three dimensional model based on two-dimensional image data, in accordance with various embodiments of the present disclosure.

FIG. 3 depicts an example block diagram of a system 300 effective to retrieve a 3D model based on 2D image data, in accordance with various embodiments of the present disclosure. Those components of FIG. 3 that have been previously described may not be described again herein for purposes of clarity and/or brevity.

In the example depicted in FIG. 3, there may be a data store (e.g., 3D model library 340) that stores data representing a plurality of 3D shape models of objects. For example, 3D model library 340 may store data representing 3D model output 350—a 3D model of an arm chair. The system 300 may be used to select a 3D model that is most similar to an object depicted in input 2D image data from among a plurality of objects stored in a data store. The 3D model retrieved using methods such as those depicted and/or described in reference to FIG. 3 may thereafter be transformed using the techniques described herein in order to generate a 3D model of the object depicted in the input 2D image(s).

In the example, depicted in FIG. 3, input 2D image data 310 may be received (e.g., depicting a chair). The input 2D image data 310 may be sent to a machine learning model such as a convolutional neural network (CNN) 330 that may be used to extract features from the input 2D image data 310. For example, CNN 330 may be trained to extract embedding data representing the input 2D image data. The CNN 330 may be trained such that the embeddings generated by the CNN 330 are in the same embedding space as shape embeddings generated for representing the various 3D models stored in 3D model library 340. For example, the CNN 330 and/or one or more other machine learning models that generate 3D models stored in 3D model library 340 may be trained to generate embeddings using training data comprising pairs of 3D models and 2D projections of those models.

Accordingly, CNN 330 may generate embeddings 344 comprising representations of the input 2D image data 310 in an embedding space that is shared by the embeddings representing the 3D models stored in 3D model library 340. After generating an embedding representing the input 2D image data 310, nearest neighbor algorithm 342 (e.g., cosine distance, Euclidean distance, etc.) may be used to determine a 3D model that most closely resembles the input 2D image data 310. For example, nearest neighbor algorithm 342 may find an embedding stored in 3D model library 340 that is the closest to the embedding representing the input 2D image data 310 (e.g., embedding 340). The embedding retrieved by nearest neighbor algorithm 342 represents a 3D model stored in 3D model library 340. Accordingly, the 3D model output 350 may be output by the system 300 and may represent the closest 3D model match for the input 2D image data 310. The 3D model output 350 may thereafter be transformed according to the various operations described above in order to generate a 3D model of the object depicted in the input 2D image data 310.

Figure 4:
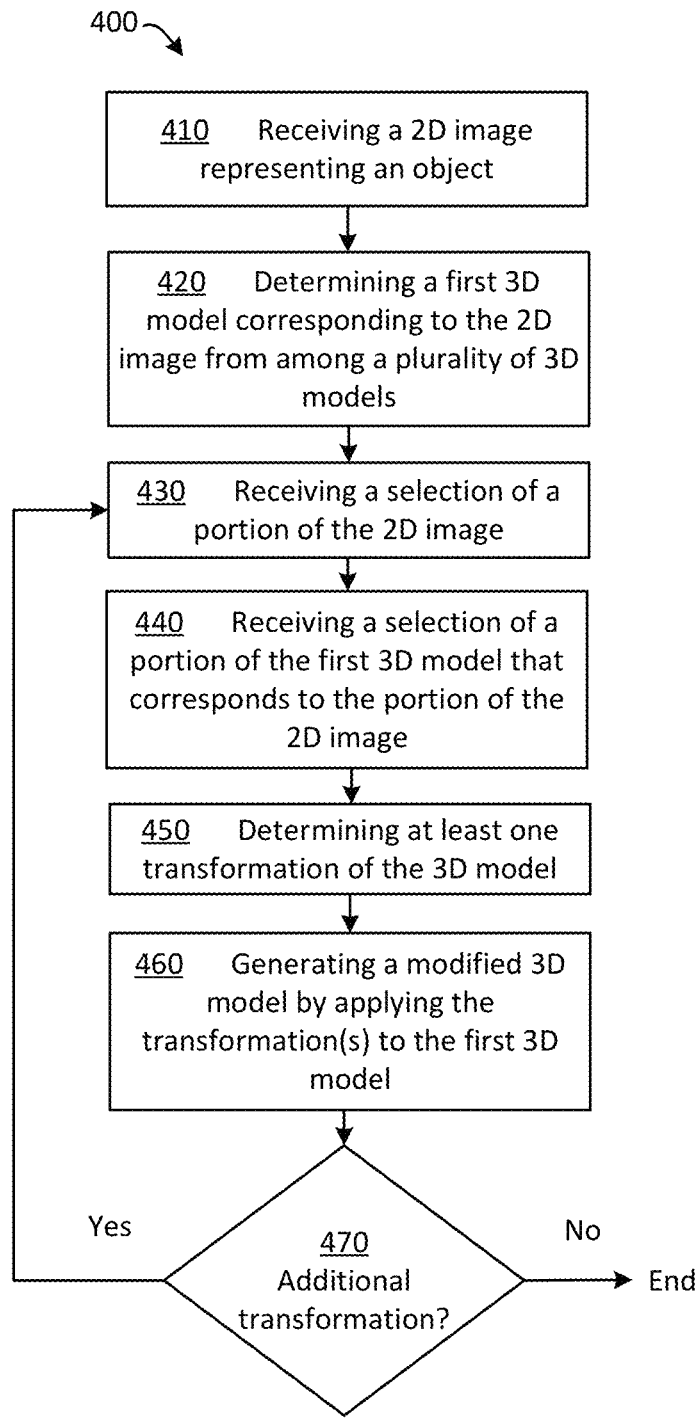
FIG. 4 depicts an example process for image-guided three-dimensional modeling, in accordance with various aspects of the present disclosure.

FIG. 4 depicts an example process 400 for image-guided three-dimensional modeling, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which a 2D image representing an object may be received. For example, one or more 2D images may be received for an object, such as an object to be sold on an e-commerce site.

Process 400 may continue from action 410 to action 420, at which a first 3D model corresponding to the one or more 2D images received at action 410 may be determined. The first 3D model may be selected from among a plurality of 3D models stored in one or more non-transitory computer-readable memories. In various examples, the first 3D model may be determined using techniques such as those described above in reference to FIG. 3. For example, an embedding (e.g., a multidimensional vector) representing the input 2D image (or images) may be determined. Similarly, there may be embeddings representing the plurality of 3D models stored in the data store. The embedding(s) generated for the 3D models may be in the same embedding space as the embedding(s) generated for the input 2D image data, as described above. Accordingly, the embedding(s) representing the input 2D image may be used (e.g., by a nearest neighbor algorithm) to determine a closest embedding among the embeddings representing the various 3D models stored in memory in the shared embedding space.

Process 400 may continue from action 420 to action 430, at which a selection of a first portion of the 2D image may be received. For example, a tie point may be selected on a portion of the 2D image. The selected tie point may represent a particular portion of the object represented in the 2D image. For example, in FIG. 1, a particular tip of a chair leg is selected.

Process 400 may continue from action 430 to action 440, at which a selection of a portion of the first 3D model may be received. The selected portion of the first 3D model may be determined to correspond to the selected portion of the 2D image data. For example, the selected portions of the 2D image and the first 3D model may be tie points that may be used to determine residuals and/or transformations that may be used to transform the first 3D model to generate a 3D model representing the input 2D image(s). In various examples, the selected portion may be a pixel and/or a group of pixels (e.g., in the example using tie points), while in other examples, contours of the 2D object and the 3D model instead by selected and used to determine residuals.

Process 400 may continue from action 440 to action 450, at which at least one transformation of the 3D model may be determined. For example, intrinsic and/or extrinsic camera parameters may be determined that may be used to modify the appearance of the 3D model to more closely resemble the input 2D image(s). In various other examples, the shape (e.g., vertices and/or edges) of the first 3D model may be deformed in order to more closely resemble the object depicted in the input 2D image(s). In various examples, the transformations may be determined based at least in part by solving an optimization problem using the differences between a geometric feature of the selected portions of the input 2D image(s) and a geometric feature of the selected portion of the first 3D model (e.g., residuals).

Process 400 may continue from action 450 to action 460, at which a modified 3D model may be generated by applying the determined transformations to the first 3D model. For example, the first 3D model may be deformed according to the transformations determined by solving the optimization problem. Additionally, in various examples, the virtual camera parameters (e.g., principal point, pose, focal length, etc.) of a virtual camera generating the 2D projection of the 3D model may be altered according to the transformations in order to generate a realistic-looking modified 3D model that represents the object depicted in the input 2D image data.

Process 400 may continue from action 460 to action 470, at which a determination may be made whether additional transformation of the 3D model is to be performed. In various examples, computations may be performed to determine a degree of alignment of the 3D model with one or more of the 2D images received at action 410. In various examples, the degree of alignment may be compared to a threshold. In an example, if the degree of alignment is less than the threshold, processing may return to action 430 and additional selections of portions of the 2D image and corresponding portions of the 3D model may be made in order to improve the alignment of the 3D model to the 2D image(s). In some other examples, instead of performing automatic computations to determine the alignment, a graphical user interface may provide an option to select additional portions of the 2D image and/or the 3D model to provide further transformation and improved alignment. For example, a graphical user interface may display an option to select additional points in order to improve the alignment and/or the modified 3D model. If, at action 470, no additional transformation is to be performed, processing may be concluded.

Figure 5:
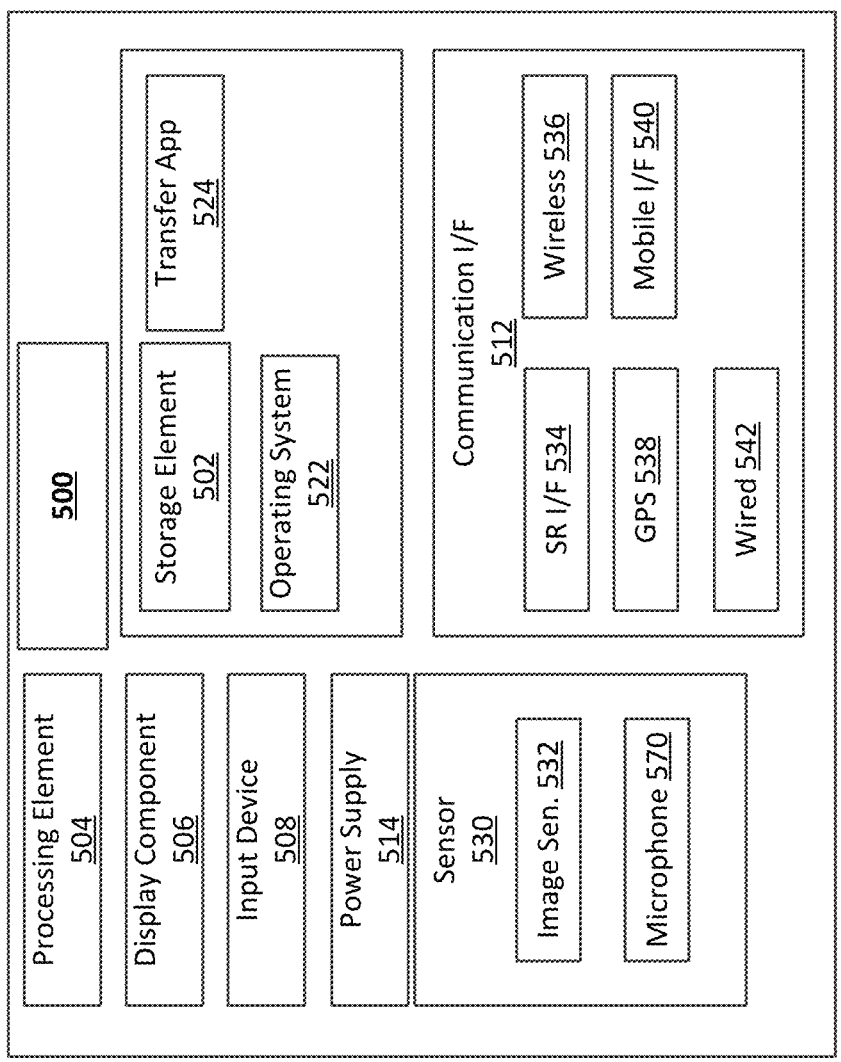
FIG. 5 is a block diagrams showing an example architecture of a computing device that may be used in accordance with various embodiments described herein.

FIG. 5 is a block diagram showing an example architecture 500 of a computing device that may be used for image-guided 3D modeling, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D pose image data generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
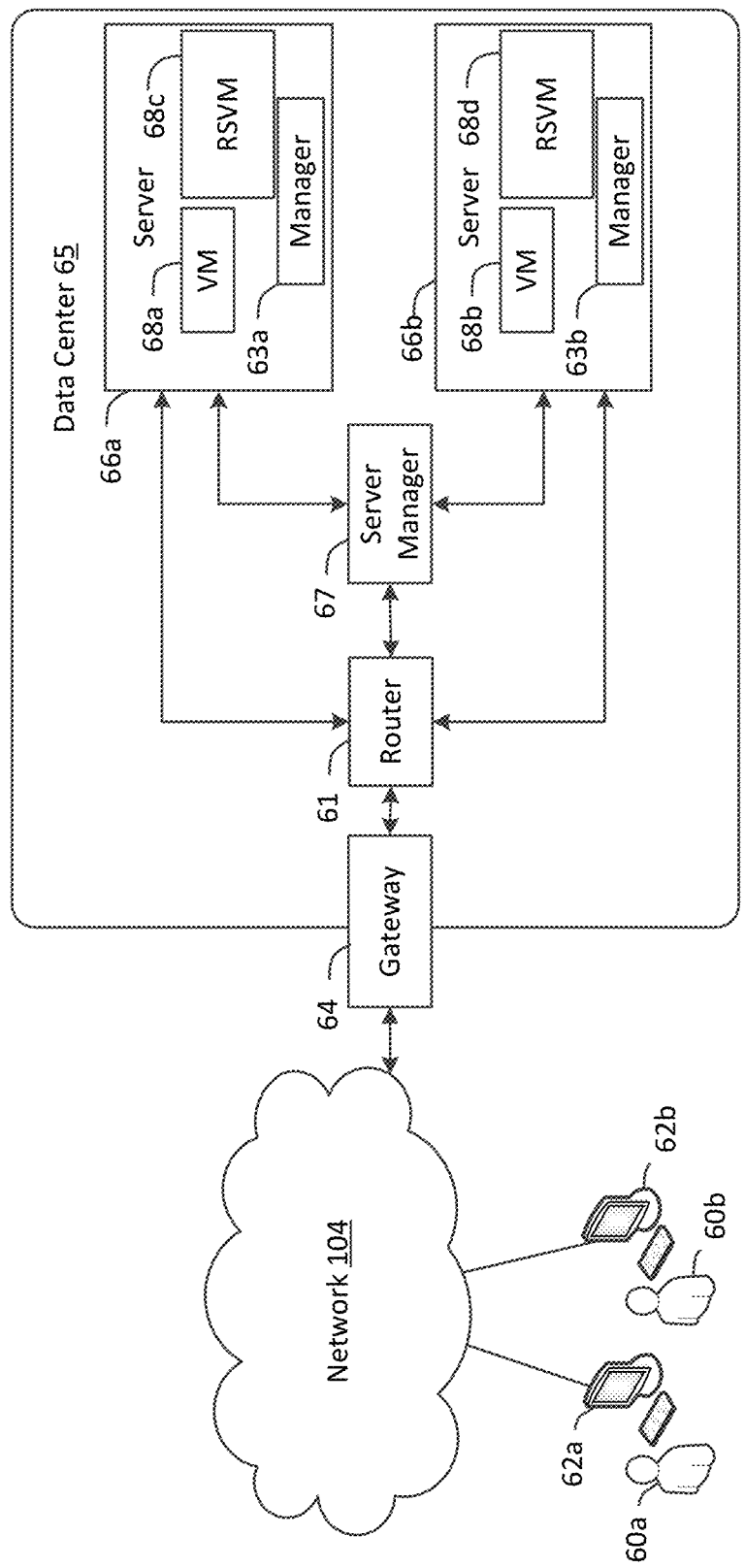
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide image-guided three-dimensional modeling as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various image-guided three-dimensional modeling techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating a modified three-dimensional (3D) model comprising:

receiving a first two-dimensional (2D) image of an object;

determining, for the first 2D image of the object, a first image embedding representing the object;

determining a first 3D model stored in a data store, the first 3D model having a first shape embedding, wherein the first shape embedding is closest to the first image embedding in an embedding space from among other shape embeddings representing other 3D models stored in the data store;

determining a first portion of the first 2D image of the object;

determining a second portion of the first 3D model, wherein the first portion and the second portion correspond to a same portion of the object as represented in the first 2D image and the first 3D model;

determining intrinsic camera parameters and extrinsic camera parameters used to modify the first 3D model to generate the modified 3D model by minimizing an objective function comprising a sum of squared differences between parametric representations of first points of the first portion of the first 2D image and corresponding parametric representations of second points of the second portion of the first 3D model divided by an error term representing a spatial error related to selection of the first points of the first portion of the first 2D image;

determining a symmetric warping operation to generate the modified 3D model by minimizing the objective function; and generating the modified 3D model using the intrinsic camera parameters, the extrinsic camera parameters, and the symmetric warping operation.

2. The method of claim 1, further comprising:
receiving first instructions from a user interface indicating a pose of the first 3D model;
superimposing the first 3D model in the pose over the first 2D image of the object; and
receiving second instructions from the user interface indicating a correspondence between the first portion of the first 2D image and the second portion of the first 3D model.

3. The method of claim 2, further comprising:
receiving a second 2D image of the object, wherein the second 2D image is captured from a different perspective relative to the first 2D image;
determining at least one correspondence between a third portion of the second 2D image and a fourth portion of the first 3D model; and
determining the intrinsic camera parameters and the extrinsic camera parameters used to modify the first 3D model to generate the modified 3D model by minimizing the objective function further comprising the sum of squared differences between parametric representations of third points of the third portion of the first 2D image and corresponding parametric representations of fourth points of the fourth portion of the first 3D model.

4. A method comprising:
receiving one or more two-dimensional (2D) images representing an object;
determining a first three-dimensional (3D) model corresponding to the one or more 2D images from among a plurality of 3D models stored in a data store in at least one non-transitory computer-readable memory;
receiving a first selection of a first portion of a first 2D image of the one or more 2D images;
receiving a second selection of a second portion of the first 3D model corresponding to the first portion of the first 2D image;
determining at least one transformation of the first 3D model based at least in part on differences between a geometric feature of the first portion of the first 2D image, a geometric feature of the second portion of the first 3D model, and an error term representing a spatial error related to the first selection of the first portion of the first 2D image; and
generating a modified 3D model by applying the at least one transformation to the first 3D model.

5. The method of claim 4, further comprising:
determining a 2D projection of the first 3D model, wherein the receiving the second selection of the second portion of the first 3D model comprises receiving a selection of a portion of the 2D projection of the first 3D model.

6. The method of claim 4, further comprising solving an optimization problem to determine at least one of a focal length and a principal point for the modified 3D model.

7. The method of claim 4, further comprising solving an optimization problem to determine a position of a camera used to capture the first 2D image.

8. The method of claim 4, further comprising:
determining a first contour of the object in the first 2D image, wherein the first contour comprises a silhouette of the object as represented in the first 2D image;
determining a second contour of the first 3D model corresponding to the first contour; and
determining the at least one transformation of the first 3D model further based at least in part on differences between a geometric feature of the first contour and a geometric feature of the second contour.

9. The method of claim 4, wherein the at least one transformation comprises a warping operation configured to generate the modified 3D model, and wherein the warping operation is constrained based at least in part on a first symmetry determined in the first 3D model.

10. The method of claim 4, further comprising:
determining a sum of a plurality of residuals describing squared differences between the geometric feature of the first portion of the first 2D image and the geometric feature of the second portion of the first 3D model;
dividing the sum of the plurality of residuals by the error term to generate an objective function output; and
determining the at least one transformation of the first 3D model that minimizes the objective function output.

11. The method of claim 4, wherein determining the at least one transformation comprises determining a deformation of the first 3D model configured to conform a 2D projection of the first 3D model to the object represented in the first 2D image.

12. The method of claim 4, further comprising:
determining, for the one or more 2D images, a first image embedding describing the object;
determining a first shape embedding in a data store, the first shape embedding being a closest embedding in an embedding space from among a plurality of shape embeddings stored in the data store; and
determining that the first 3D model is associated with the first shape embedding.

13. A system comprising:
at least one processor; and
at least one non-transitory computer-readable memory storing instructions that, when executed by the at least one processor, are effective to program the at least one processor to:
receive one or more two-dimensional (2D) images representing an object;
determine a first three-dimensional (3D) model corresponding to the one or more 2D images from among a plurality of 3D models stored in a data store in the at least one non-transitory computer-readable memory;
receive a first selection of a first portion of a first 2D image of the one or more 2D images;
receive a second selection of a second portion of the first 3D model corresponding to the first portion of the first 2D image;
determine at least one transformation of the first 3D model based at least in part on differences between a geometric feature of the first portion of the first 2D image, a geometric feature of the second portion of the first 3D model, and an error term representing a spatial error related to the first selection of the first portion of the first 2D image; and
generate a modified 3D model by applying the at least one transformation to the first 3D model.

14. The system of claim 13, the at least one non-transitory computer-readable memory storing further instructions that, when executed by the at least one processor, are further effective to program the at least one processor to:
determine a 2D projection of the first 3D model, wherein the receiving the second selection of the second portion of the first 3D model comprises receiving a selection of a portion of the 2D projection of the first 3D model.

15. The system of claim 13, the at least one non-transitory computer-readable memory storing further instructions that, when executed by the at least one processor, are further effective to program the at least one processor to solve an optimization problem to determine at least one of a focal length and a principal point for the modified 3D model.

16. The system of claim 13, the at least one non-transitory computer-readable memory storing further instructions that, when executed by the at least one processor, are further effective to program the at least one processor to solve an optimization problem to determine a position of a camera used to capture the first 2D image.

17. The system of claim 13, the at least one non-transitory computer-readable memory storing further instructions that, when executed by the at least one processor, are further effective to program the at least one processor to:
- determine a first contour of the object in the first 2D image, wherein the first contour comprises a silhouette of the object as represented in the first 2D image;
- determine a second contour of the first 3D model corresponding to the first contour; and
- determine the at least one transformation of the first 3D model further based at least in part on differences between a geometric feature of the first contour and a geometric feature of the second contour.

18. The system of claim 13, wherein the at least one transformation comprises a warping operation configured to generate the modified 3D model, and wherein the warping operation is constrained based at least in part on a first symmetry determined in the first 3D model.

19. The system of claim 13, the at least one non-transitory computer-readable memory storing further instructions that, when executed by the at least one processor, are further effective to program the at least one processor to:
- determine a sum of a plurality of residuals describing squared differences between the geometric feature of the first portion of the first 2D image and the geometric feature of the second portion of the first 3D model;
- divide the sum of the plurality of residuals by the error term to generate an objective function output; and
- determine the at least one transformation of the first 3D model that minimizes the objective function output.

20. The system of claim 13, wherein determining the at least one transformation comprises determining a deformation of the first 3D model configured to conform a 2D projection of the first 3D model to the object represented in the first 2D image.

* * * * *